(12) United States Patent
Tweed et al.

(10) Patent No.: US 7,713,601 B2
(45) Date of Patent: May 11, 2010

(54) POLYLACTIC ACID SHRINK FILMS AND METHODS OF CASTING SAME

(75) Inventors: Edward Carl Tweed, Gahanna, OH (US); Joseph B. McDaniel, Gahanna, OH (US)

(73) Assignee: Plastic Suppliers, Inc., Columbus, OH (US)

( * ) Notice: Subject to any disclaimer, the term of this patent is extended or adjusted under 35 U.S.C. 154(b) by 623 days.

(21) Appl. No.: 11/561,771

(22) Filed: Nov. 20, 2006

(65) Prior Publication Data
US 2007/0116909 A1    May 24, 2007

Related U.S. Application Data

(60) Provisional application No. 60/738,029, filed on Nov. 21, 2005.

(51) Int. Cl.
*B65B 53/00* (2006.01)
*F16B 4/00* (2006.01)

(52) U.S. Cl. .............. 428/35.1; 428/34.9; 428/220; 264/556; 264/176.1; 264/177.17; 264/177.19; 264/210.7; 264/532

(58) Field of Classification Search ............... 428/34.9, 428/35.1, 220; 525/186, 190, 415, 450; 264/556, 264/176.1, 177.17, 177.19, 210.7, 532
See application file for complete search history.

(56) References Cited

U.S. PATENT DOCUMENTS

| | | | |
|---|---|---|---|
| 2,703,316 A | 3/1955 | Schneider |
| 3,557,947 A | 1/1971 | Greenwell |
| 3,910,013 A | 10/1975 | Babineau |
| 4,255,315 A | 3/1981 | Anspon |
| 4,333,570 A | 6/1982 | Heider |
| 4,403,695 A | 9/1983 | Raymoure et al. |
| 4,463,861 A | 8/1984 | Tsubone et al. |
| 4,734,304 A | 3/1988 | Tsubone et al. |
| 5,078,289 A | 1/1992 | Bolton et al. |
| 5,230,906 A | 7/1993 | Mueller |

(Continued)

FOREIGN PATENT DOCUMENTS

AU    2002244739 B2    3/2002

(Continued)

OTHER PUBLICATIONS

Mitsubishi Plastics, Inc., "New Business: Biodegradable Plastic Fillm and Sheet," ECOLOJLU, 2004, Web Page, www.mpi.co.jp/english/newbusi/index.htm, 5 pp.

(Continued)

*Primary Examiner*—Michael C Miggins
(74) *Attorney, Agent, or Firm*—Gilberto M. Villacorta; Sunit Talapatra Foley & Lardner LLP

(57) ABSTRACT

A heat-shrinkable polylactic acid (PLA) film and a method of its manufacture are provided. In an exemplary embodiment, the PLA films exhibit heat-induced shrinkage in the transverse direction with little to no concomitant shrinkage in the machine direction. The films may comprise any grade of PLA polymer, optionally including additives, such as antiblock, slip, plasticizers, viscosity enhancers and combinations thereof. A method of cast and tenner manufacture is disclosed, which includes a temperature conditioning step.

23 Claims, 4 Drawing Sheets

U.S. PATENT DOCUMENTS

| | | |
|---|---|---|
| 5,444,113 A | 8/1995 | Sinclair et al. |
| 5,460,878 A | 10/1995 | Hostetter |
| 5,466,499 A | 11/1995 | Takagi et al. |
| 5,502,158 A | 3/1996 | Sinclair et al. |
| 5,753,326 A | 5/1998 | Blackwelder |
| 5,756,577 A | 5/1998 | Gutierrez-Villarreal |
| 5,760,118 A | 6/1998 | Sinclair et al. |
| 5,766,748 A | 6/1998 | Ikado et al. |
| 5,788,076 A | 8/1998 | Simmons |
| 5,834,582 A | 11/1998 | Sinclair et al. |
| 5,844,066 A | 12/1998 | Kakizawa |
| 5,851,610 A | 12/1998 | Ristey et al. |
| 6,291,597 B1 | 9/2001 | Gruber et al. |
| 6,306,969 B1 | 10/2001 | Patel et al. |
| 6,312,823 B1 | 11/2001 | El-Afandi et al. |
| 6,607,996 B1 | 8/2003 | Matsunaga et al. |
| 6,669,771 B2 | 12/2003 | Tokiwa et al. |
| 6,713,175 B1 | 3/2004 | Terada et al. |
| 6,756,331 B2 | 6/2004 | Kasemura et al. |
| 6,815,475 B2 | 11/2004 | Donald et al. |
| 6,822,136 B1 | 11/2004 | Niemeyer et al. |
| 6,822,137 B1 | 11/2004 | Dujon et al. |
| 6,897,260 B2 | 5/2005 | Vynckier |
| 7,101,935 B2 | 9/2006 | Vynckier |
| 7,175,917 B2 | 2/2007 | Sukigara et al. |
| 7,351,785 B2 | 4/2008 | Matsumoto et al. |
| 2002/0160201 A1 | 10/2002 | Ohkura et al. |
| 2002/0192412 A1 | 12/2002 | Satani et al. |
| 2002/0198332 A1 | 12/2002 | Kasemura et al. |
| 2003/0119971 A1 | 6/2003 | Donald et al. |
| 2003/0148688 A1 | 8/2003 | Matsunaga et al. |
| 2004/0092672 A1 | 5/2004 | Bastioli et al. |
| 2005/0158492 A1 | 7/2005 | Vynckier |
| 2005/0177946 A1 | 8/2005 | Riley |
| 2005/0203208 A1 | 9/2005 | Ruiz |
| 2006/0045940 A1 | 3/2006 | Tweed et al. |
| 2007/0054073 A1 | 3/2007 | Tweed et al. |
| 2008/0050603 A1 | 2/2008 | Randall et al. |

FOREIGN PATENT DOCUMENTS

| | | |
|---|---|---|
| EP | 0 979 722 B1 | 2/2000 |
| EP | 1 038 906-0 | 9/2000 |
| JP | 2003-119367-0 | 4/2003 |
| JP | 2003-155358-0 | 5/2003 |
| JP | 2003-253008 A0 | 9/2003 |
| JP | 2007-216541-0 | 8/2007 |
| WO | WO 02/072335 A1 | 9/2002 |
| WO | WO-03/016015 A0 | 2/2003 |

OTHER PUBLICATIONS

U.S. Appl. No. 11/209,808 (Office Actions therein).
U.S. Appl. No. 11/406,530 (Office Actions therein).
U.S. Appl. No. 11/592,263 (Office Actions therein).
U.S. Appl. No. 12/180,149 (Office Actions therein).
Reubi, et al., "Concomitant Expression of Several Peptide Receptors in Neuroendocrine Tumours: Molecular Basis for in Vivo Multireceptor Tumour Targeting," European Journal of Nuclear Medicine and Molecular Imaging, vol. 30, No. 5, 2003, pp. 781-793.
Notice of Allowance and Fee(s) Due corresponding the U.S. Appl. No. 11/592,263, dated Jul. 31, 2009, 10 pages.
U.S. Appl. No. 11/592,263, Office Action, dated Apr. 2, 2009.
U.S. Appl. No. 12/180,149 Office Action, dated May 12, 2009.
EPC Communication corresponding to EP Application No. 05791246.1, dated Aug. 21, 2009, 4 pages.
Notice of Allowance and Fee(s) Due, corresponding to U.S. Appl. No. 11/592,263, dated Jul. 31, 2009, 10 pages.

POLYLACTIC ACID SHRINK FILMS AND METHODS OF CASTING SAME

CROSS-REFERENCE TO RELATED PATENT APPLICATIONS

This application claims priority to U.S. provisional patent application No. 60/738,029 filed Nov. 21, 2005, the disclosure of which has been incorporated by reference herein in its entirety.

FIELD OF THE INVENTION

The present invention relates generally to heat-shrinkable film. More particularly, the present invention relates to heat-shrinkable polylactic acid films that exhibit temperature dependent shrinkage in one, i.e. "transverse direction," with little to no shrinkage in the other, i.e. "machine direction."

BACKGROUND OF THE INVENTION

Heat-shrinkable films have widely been used for various industrial applications such as, for example, with shrink-wrap films, shrinkable labels and cap seals, by making use of their property of heat-dependent shrinkage. The films have been applied to a variety of surfaces, including plastic and glass surfaces. Shrink films have been manufactured from vinyl chloride resins, polystyrene resins or polyester resins; however, in many instances, film shrinkage is concomitant with undesirable "draw back" of the outer edges of the film (a.k.a. "smiling" or "frowning"). The undesirable draw back of the outer edges has limited the application of shrink films. Therefore, there is a need for shrink films that have little to no draw back.

As well, interest in compostable polymers, i.e. biopolymers, has greatly increased, and many companies have made efforts to market, for example, packaging materials, hygiene products, sacks, and films with compostable polymers. Polylactic acid (PLA), i.e., polylactide, or condensation polymers which are based on lactic acid, are for many reasons a very attractive group of biopolymers. Their principal degradation product, lactic acid, is a product common in nature, it is not toxic and is used widely in the food and pharmaceutical industries.

PLA films can be manufactured by either blown film or casting (e.g., cast and tenner) techniques. While either method has advantages and drawbacks, the cast film is generally better suited for certain end-user applications, such as those requiring film "sleeves" rather than "wrap-around" film. Further, cast film generally has much better optics than a blown film and can be produced at higher line speeds. However, PLA films that are manufactured by current casting methods exhibit excessive shrinkage in the machine direction, which substantially contributes to curling and limits their range of application. Thus, there is a need for PLA shrink films manufactured by casting methods that exhibit little to no shrinkage in the machine direction.

SUMMARY OF THE INVENTION

The foregoing needs are met, to an extent, by the present invention, wherein in one embodiment shrink film comprised of a transverse direction oriented PLA polymer blend film is provided which, upon exposure to heat, exhibits shrinkage in the transverse direction and less than about 10% shrinkage in the machine direction. In a preferred embodiment, the shrinkage in the machine direction does not exceed about 5%. The shrink film may exhibit shrinkage in the transverse direction in the range of about 10% to about 80% and exhibit a shrinkage in the machine direction in the range of about 0% to about 5% when subjected to about 60° C. heat for about 10 seconds. In some embodiments, the shrink film may exhibit shrinkage in the transverse direction of about 30% to about 80% and exhibit shrinkage in the machine of about 0% to about 3% when subjected to about 60° C. heat for about 10 seconds. In other embodiments, the shrink film may exhibit shrinkage in the transverse direction of about 25% and exhibit a shrinkage in the machine direction of about 0% or less (a negative value indicates growth) when subjected to about 60° C. heat for about 10 seconds.

The inventive PLA shrink films may further comprise one or more additives, such as an antiblock additive, a slip additive, a viscosity enhancer or a combination thereof. The antiblock additive may be natural silica, synthetic silica, talc, talc filled magnesium, calcium carbonate, and N,N'-Ethylene Bis (Stearamide) (EBS). The preferred antiblock additive in some embodiments is talc filled magnesium. The slip additive may be oleamide, erucamide, stearamide, behenamide, oleyl palmitamide, stearyl erucamide, ethylene bis-oleamide, EBS, or a combination thereof, and preferably EBS in some embodiments. Viscosity enhancers may include, for example, stabilizers or coupling agents. A preferred coupling agent is CESA®-extend.

The PLA polymer blends of the inventive shrink films disclosed herein may include two or more "grades" of PLA polymer. For example, PLA polymer may comprise about 1 to about 2 percent by weight D-lactide; about 3 to about 5 percent by weight D-lactide; or about 11 to about 13 percent by weight D-lactide. In some embodiments, the shrink films may comprise about 50 weight percent to about 90 weight percent of PLA polymer having about 11 to about 13 percent by weight D-lactide; and about 10 weight percent to about 50 weight percent of a PLA polymer having about 1 to about 2 percent by weight D-lactide. In other embodiments, the shrink films may comprise about 60 weight percent to about 80 weight percent of PLA polymer having about 11 to about 13 percent by weight D-lactide; and about 20 weight percent to about 40 weight percent of a PLA polymer having about 1 to about 2 percent by weight D-lactide. In yet other embodiments, the shrink films may comprise about 65 weight percent to about 75 weight percent of PLA polymer having about 11 to about 13 percent by weight D-lactide; and about 25 weight percent to about 35 weight percent of a PLA polymer having about 1 to about 2 percent by weight D-lactide.

Further, the present invention provides films comprising about 50 weight percent to about 90 weight percent of PLA polymer having about 11 to about 13 percent by weight D-lactide; about 10 weight percent to about 50 weight percent of a PLA polymer having about 1 to about 2 percent by weight D-lactide; less than about 3 percent by weight of an antiblock additive; less than about 1 percent of a slip additive; and less than about 0.5 percent of a viscosity enhancer. The inventive films may also comprise about 50 weight percent to about 90 weight percent of PLA polymer having about 11 to about 13 percent by weight D-lactide; about 10 weight percent to about 50 weight percent of a PLA polymer having about 1 to about 2 percent by weight D-lactide; less than about 2 percent by weight of an antiblock additive; less than about 0.5 percent of a slip additive; and less than about 0.25 percent of a viscosity enhancer. Preferably, in some embodiments, the inventive shrink films comprise about 50 weight percent to about 90 weight percent of PLA polymer having about 11 to about 13 percent by weight D-lactide; about 10 weight percent to about 50 weight percent of a PLA polymer having about 1 to about 2 percent by weight D-lactide; less than about 1 percent by weight of an antiblock additive; less than about 0.25 percent of a slip additive; and less than about 0.1 percent of a viscosity enhancer.

In accordance with another embodiment of the present invention, a packaged good is provided comprising a consumable item and a heat treated sleeve over at least a portion of the consumable item, which heat treated sleeve is obtained by exposing to heat a PLA shrink film comprised of a PLA polymer blend which exhibits shrinkage in the transverse direction and less than about 10%, preferably less than about 5%, shrinkage in the machine direction upon exposure to heat. The packaged good may be a consumable item, including batteries, cans, bottles, disposable lighters, pens and decorative items. The sleeve may form a perforated or non-perforated neck band around the consumable item and may be clear, matte, translucent, or opaque. The packaged good with the heat treated sleeve may include a packaging label and the label may be printed onto the film.

In yet another embodiment of the present invention, a method of making a shrink film is provided comprising: (a) providing dry pellets of PLA, (b) melting the pellets to form a molten mass, (c) extruding the resulting molten mass, (d) casting the extrusion between at least three casting rollers to form a film, (e) adjusting the temperature of the film, and (f) stretching the film in the transverse direction. The method may optionally include drying the pellets, for example, in a dehumidifying hopper, prior to melting the pellets to form a molten mass.

The melting step may be carried out at a temperature may range from about 165° C. to about 230° C., preferably from about 170° C. to about 200° C., and more preferably at about 175° C. The extruding may take place though a T style die, and the temperature conditioning of the film may take place in a machine direction orienting ("MDO") machine, which may further be equipped with one or more idler rollers. The stretching may be carried out in a tenner machine, preferably at a temperature ranging about 70° C. to about 90° C., more preferably at about 80° C. In some embodiments of the disclosed invention, the method may further include annealing the film. The annealing may be carried out at a temperature ranging from about 50° C. to about 90° C., preferably at about 70° C. with a overall shrink back of 1%-5%

In further yet another embodiment of the present invention, casting machine with three or more rollers is provided. The three or more rollers may be motorized and/or temperature controlled.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
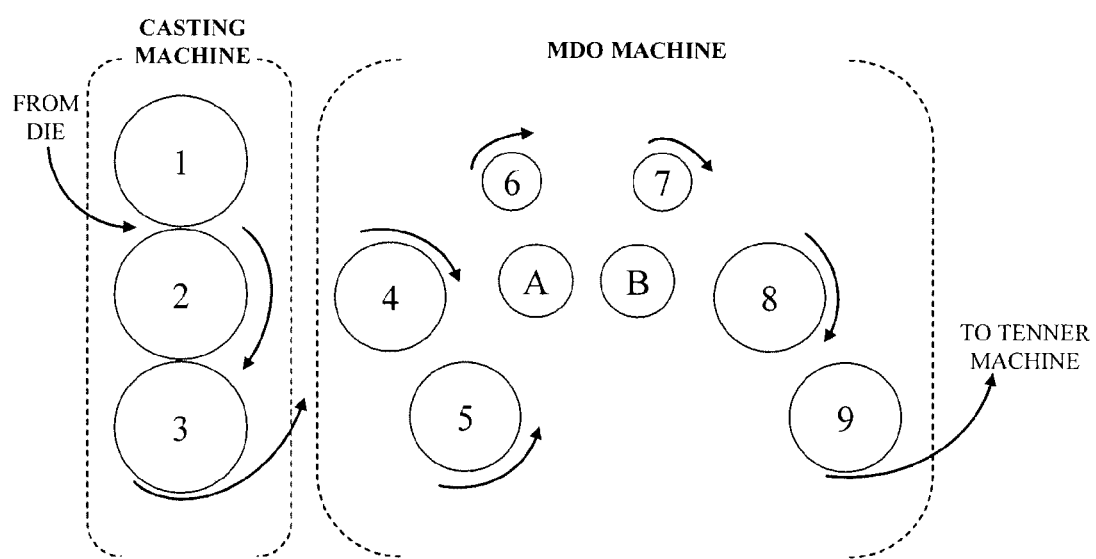
FIG. 1 is a schematic diagram of the movement of polymer film from a die through casting and MDO machines and then to a tenner machine in accordance with one embodiment of the present invention. The pathway through the casting machine and tenner machine is illustrated with arrows. A general outline of the respective machines is provided by dashed lines. Circles represent rollers.

In one embodiment of the instant invention, plastic films and a method of their manufacture are described. The polymer films are generated that, when heat treated, shrink in the transverse direction and exhibit little to no shrinkage in the machine direction. In a preferred embodiment, the shrink films of the invention exhibits a shrinkage, upon heating, in the transverse direction of no less than about 40%, preferably no less than about 50%, and most preferably no less than about 60%. Similarly, in a preferred embodiment, the shrink films of the invention exhibits a shrinkage, upon heating, in the machine direction of no greater than about 10%, preferably no greater than about 5%, even more preferably no greater than about 3%, and most preferably about 0% or less (a negative value indicates growth). The shrinkage in either direction preferably occurs substantially simultaneously.

The machine direction will be defined herein as the "longitudinal" or "length" direction. The "transverse direction, also termed "cross direction" or "cross web direction," will be defined herein as the direction perpendicular to the machine direction. Embodiments of films described herein exhibit reduced edge-curling characteristics and can be produced in clear, matte, translucent colors and opaque colors. Films of the present invention may be suitable for back side and/or front side printing.

Films of the present invention may comprise various polymers and polymer grades of polylactic acid ("PLA") known in the art. Preferably, in some embodiments, polymers are selected that, when used alone or in a blend, enable "memory" to be stored from an orienting process described herein. Many of the determinants for polymer selection are known to one of ordinary skill in the art and/or will be apparent from the teachings herein. For example, where high temperature processing is desired, polymers with higher softening points may be selected, such as, for example, relatively high molecular weight polymers.

Shrink films of the instant invention comprise PLA, and may optionally include additives known in the art, e.g., antiblock additives, slip additives, plasticizers and "viscosity enhancers." These additives are generally employed to enhance the processing, performance and look of the final product as will be discussed below. In each of the aforementioned classes, various grades of the respective polymers are understood to be included. Each of these classes of polymers and additives will now be discussed, in turn, as relevant to the instant invention.

PLA

Since both lactic acid and lactide can achieve the same repeating unit, the general term polylactic acid as used herein refers to polymers having the repeating unit of formula I without any limitation as to how the polymer was made (e.g., from lactides, lactic acid, or oligomers), and without reference to the degree of polymerization.

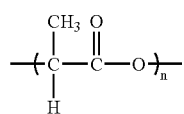

(I)

The polylactide used in the invention may be made from L-, D- or D,L-lactide, or blends thereof, by any polymerization process. A high molecular weight polymer can be produced by ring-opening polymerization from lactic acid dimer, lactide. Lactic acid is optically active, and thus its dimer appears in four different forms: L,L-lactide; D,D-lactide; L,D-lactide ("mesolactide"); and a racemic mixture of L,L- and D,D-lactides. By polymerizing these dimers either as pure compounds or at different blend proportions, polymers are obtained which have different stereochemical structures affecting their resilience and crystallinity and, consequently, also their mechanical and thermal properties. The obtained polymers are usually hard and optically clear.

Copolymers or polymer blends may also be used in PLA films of the present invention, The weight-average molecular weight (Mw) of polymers suitable to the invention is approximately 10,000-400,000, preferably 40,000-250,000.

Polylactide is in equilibrium with its monomer, lactide. This chemical property can lead to rapid hydrolysis and cause problems of adhesion in the processing of the polymer. Furthermore, the presence of the monomer lowers thermal stability during melt processing. Therefore, residual lactide is typically and preferably removed from the polymer. Preferable monomer content is preferably below about 2%, and more preferably below about 1%.

Heat, during film processing steps, may also contribute to polymer degradation. In addition to the removal of lactide monomer, another way to retard premature hydrolysis of the polymer is to reduce the water content of the polymer to below 500 ppm, and more preferably, to below 200 ppm. Methods to further reduce and/or maintain low water content are described herein below.

PLA is available from multiple suppliers and the polymers and/or polymer blends of the instant invention are not limited to any one grade or supplier thereof. However, NatureWorks® polymers, as supplied by Cargill, Inc. are preferred in some embodiments of the instant invention (e.g., grades 4060D, 4042D, 4032D). While each of grades 4060D, 4042D and 4032D has a molecular weight average 200,000 to about 400,000, they are prepared with differing percentages of D-lactide. Grade 4042D is prepared with about 3 to about 5 weight percent D-lactide. Grade Grade 4060D comprises about 11 to about 13 percent D-lactide; grade 4032D polymer comprises about 1 to about 2 percent D-lactide. These polymers are supplied with a lactide concentration of lower than about 1 percent, a mesolactide level of about 10 percent to about 20 percent, and a moisture level lower than about 500 ppm.

While the instant invention can be suited with any PLA polymer of any grade and composition, the concentration of D-lactide, in particular, can affect the physical properties of the resulting PLA polymer. By way of example, increasing the percent of D-lactide in a polymer or a polymer blend reduces the capacity of the resulting polymer to crystallize, which, in turn, increases undesirable degradation of the polymer at higher temperatures. Said another way, lowering the weight percent of D-lactide in a polymer composition increases the temperature resistance of the polymer and hence the viscosity of the resulting melt at a given temperature as well.

Polymers and/or polymer blends with higher levels of D-lactide can yield films that begin to shrink at lower temperatures when exposed to heat; these films also tend to exhibit more "gentle" shrink curves, i.e., less shrinkage per rise in temperature. Conversely, films comprising polymers with relatively low D-lactide concentration generally require exposure to higher temperatures to shrink. It should also be noted that, typically, PLA polymers with lower concentrations of D-lactide are more expensive than otherwise equivalent polymers having greater D-lactide. Therefore, there can be an economic incentive to maximize the use of PLA with higher levels of D-lactide; however, this incentive should and can be balanced with the desired physical properties of the films.

Antiblock Additives

Antiblock (also called "antitack") additives serve to improve processing and application of polymer films. Specifically, this class of additives is used to reduce the adhesion between films. Antiblock agents—typically finely divided, solid minerals, but also waxes—act by producing a slight roughening of the surface. Antiblock agents are mainly used in film extrusion and include natural silica, synthetic silica, talc, calcium carbonate, and N,N'-Ethylene Bis(Stearamide) (EBS).

Antiblock additives are typically "loaded" with a carrier compound. While it is by no means a requirement, it is preferable that the carrier polymer be similar to or equivalent to one or all of the polymers in the master PLA blend. In the instant invention, for example, it is preferred that the carrier polymer be a PLA polymer. As the "active ingredient" in an antiblock comprises only a small fraction of the final composition, adding a carrier compound provides ease and consistency in measurements. One of ordinary skill in the art would recognize to take the concentration of filler into account when calculating the final concentration of antiblock in the final product. For example, if a composition comprising 10 percent antiblock consists of 10 percent "active ingredient," the final concentration of the "active ingredient" is 1.0 percent of the total. The values hereinbelow, including those in Tables 1 and 2, are provided as a percentage of the "active ingredient" in the final formulation.

In the instant invention, the final concentration of antiblock is less than about 3 percent by weight, preferably less than about 2 percent by weight, and more preferably less than about 1 percent by weight. In one embodiment of the present invention, antiblock 2100D from Cargill is preferred. 2100D comprises 10% talc filled magnesium silicate in grade 4032D PLA carrier and has a mean particle size of less than about 1 micron.

In selecting an appropriate antiblock agent, the particle size thereof is one factor to consider. Indeed, the particle size of an antiblock agent can directly contribute to the overall smoothness of the resulting film. That is, all other factors being equal, a smaller antiblock particle size will result in a smoother film. Another factor to consider is the concentration of the antiblock. The concentration of antiblock is preferably minimized particularly, as in some cases, because antiblock additives can introduce haze to the film. Hence, particularly in applications where haze is undesirable (e.g., envelope windows, etc.), the concentration of antiblock may be minimized.

Slip Additives/processing Aids

Processing aids refer to a class of agents that generally aid in the downstream manufacturing (i.e., post-extrusion operations) of the various film products. Slip additives, for example, are modifiers that act as an internal lubricant to reduce the coefficient of friction (COF) between two overlapping films, for example, in films rolled after production. Indeed, lower COFs are especially desirable for film applications. These additives migrate to the surface of the plastic during and immediately after processing. That is, a non-visible coating "blooms" to the surface to provide a microscopic "layer" of air between two adjacent sheets of film. In this way, enhanced lubricity and slip characteristics are provided.

Accordingly, slip additives may be considered similar to antiblock additives in that they both serve to lower the COF between two overlapping films. Films of the instant invention may comprise one, both or neither class of additives. Typical slip agents are, for example, oleamide, erucamide, stearamide, behenamide, oleyl palmitamide, stearyl erucamide, ethylene bis-oleamide, EBS, including most grades of their respective refinement. In some embodiments, EBS is a preferred slip agent, and EBS with 4032D carrier is more preferred. These and other slip additives and processing aids are commercially available under the following trade names: Adogen 42, Armid 18, Crodamide VRX, E, ER, and BR, Danimer 9205, Freeflow Z100 and Z200, Incromold, Incroslip, Kemamides, Kemamide P-181, MoldWiz Int-33CRS, Paraloid EXL, Uniwax 1750 and Viton. EBS is sold under the trade names Advawax, Lubrol EA and Micotomic 280.

As with antiblock agents, the "active ingredient" of slip additives is generally supplied with a carrier. Films of the instant invention comprise less than about 1 percent by weight of a slip additive (referring to the "active ingredient" only), and more preferably less than about 0.5 percent by weight. It should be noted that excessive amounts of slip additive may produce films that are excessively smooth, which can compromise the ability of substances (e.g., ink, stickers, etc.) to adhere to the surface. Thus, to enhance, for example, the printing properties of shrink films of the instant invention, the amount of slip additive may require adjustment accordingly.

Plasticizers

While practice of the present invention does not require the use of impact modifiers (a.k.a. "plasticizers"), their use may be beneficial in processing. For example, some plasticizers can reduce brittleness. Many plasticizers are known in the art and the present invention is not limited in their use herein. Non-limiting examples include: commonly available commercial plasticizers, for example, mono- and polycarboxylic acid esters, polymeric polyesters, polyalkyl ethers, glycerol and glycol esters (e.g., glycerol triacetate and glycerol tripropionate), low molecular weight aliphatic and aromatic polyesters, and blends of thereof. Also various polymeric plasticizers such as citrate esters, adipate esters, epoxidized soy oils, acetylated coconut oil, linseed oil, and mixtures thereof are suitable. As well, it is commonly appreciated that the addition of lactic acid, lactides (including, D- and L-lactide, meso and racemic D,L-lactide), oligomers of lactic acid, oligomers of lactide, and mixtures thereof, in a PLA blend may act as plasticizers of the polymer.

Viscosity Enhancers

Although numerous methods are known and available to increase the viscosity of polymers during processing of cast and tenner films, the term "viscosity enhancer" is defined herein to encompass any chemical agent that increases or maintains the viscosity of a polymer at a given temperature. Viscosity enhancers may be introduced into the polymer blend at any time until the polymer enters the die (discussed below), however, viscosity enhancers are preferably introduced prior to extrusion, and more preferably, during blending of the polymer pellets.

Viscosity enhancers can improve the finished properties of films by preventing and/or reversing the degradation encountered during processing of polymer films. Some viscosity enhancers are "stabilizers." That is, they are used in virgin plastic to either (1) protect against degradation in processing and/or (2) reverse the degradation caused by recycling, and return the plastic to nearly its original performance properties. Another class of viscosity enhancers, "coupling agents," for example, improves the processability of extruded polymer by "coupling" individual polymer strands thereby increasing the melt strength of the plastic.

Viscosity enhancers are generally known and available to one of ordinary skill in the art and have their broadest application with polyesters, polyamides (nylon) and polycarbonates. Though the chemical identity of viscosity enhancers is generally proprietary, the products are available from vendors such as Johnson Polymer LLC (USA) and Clariant International Ltd. (Switzerland). Viscosity enhancers suitable in the instant invention are not limited to those exemplified and/or those with similar mechanisms. In fact, any chemical agent that increases or maintains the viscosity of a polymer at a given temperature may suffice.

In a preferred embodiment of the invention, shrink films are generated comprising a coupling agent for enhancing viscosity. One such coupling agent, CESA®-extend, is available from Clariant. These viscosity enhancers contain a proprietary copolymer of styrene, methyl methacrylate and glycidyl methacrylate. Without being limited by or bound to theory, CESA®-extend viscosity enhancers are thought to repair the damage (e.g., polymer breakdown) that heat and moisture can cause to PLA resins by coupling individual PLA polymers. In this way, the viscosity enhancer may "extend" polymer chains in the presence of some degradation and thereby attenuate overall loss of molecular weight and viscosity of the polymer melt.

Optimum reactivity of CESA®-extend can be achieved with a preferable use level of less than about 0.15 percent by weight, and preferably less than about 0.75 percent by weight of the active ingredient. Again, the "active ingredient" of viscosity enhancers is generally supplied with a carrier. CESA®-extend viscosity enhancers may undergo a process residence time of about 2 to about 20 minutes, depending on starting moisture and/or inherent starting viscosity of the polymer. As well, process residence times are preferably minimized to attenuate polymer degradation from the heat required in the process. A detailed discussion of processing conditions is provided below. In any event, one of ordinary skill in the art would appreciate that it may be necessary to adjust the concentration of any polymer enhancer based, at least, on some of the factors listed above.

In some embodiments, polymers for films may be selected from one or more of five groups (i.e., PLA, antiblock and slip additives, plasticizers, viscosity enhancers) and combined to create blended polymer films. Tables 1 and 2 below provides non-limiting examples of formulations that may be suitable in the preparation of films of the present invention. For clarity in description, a skilled artisan should appreciate from the teachings herein that the percent of additives calculated is only the "active ingredient." In other words, while it should be appreciated that the additives are generally supplied in as a combination of "active ingredient" and carrier, the percent of carrier, if any, has not been listed.

TABLE 1

Polymer Formulations

Composition (percentage by weight)

| No. | 4060D | 4042D | 4032D | Anti-block | Slip | Visc. Enhancer |
|---|---|---|---|---|---|---|
| 1 | 69.58% | 0% | 30% | 0.15% | 0.18% | 0.09% |
| 2 | 97.50% | 0% | 0% | 1.50% | 0.50% | 0.50% |
| 3 | 0% | 0% | 99.58% | 0.15% | 0.18% | 0.09% |
| 4 | 0% | 0% | 97.50% | 1.50% | 0.50% | 0.50% |
| 5 | 0% | 98.58% | 0% | 0.15% | 0.18% | 0.09% |
| 6 | 0% | 98% | 0% | 1.50% | 0.50% | 0.50% |
| 7 | 98.58% | 0% | 0% | 0.15% | 0.18% | 0.09% |
| 8 | 59.58% | 10% | 30% | 0.15% | 0.18% | 0.09% |
| 9 | 49.58% | 20% | 30% | 0.15% | 0.18% | 0.09% |
| 10 | 39.58% | 30% | 30% | 0.15% | 0.18% | 0.09% |
| 11 | 48.61% | 30% | 20% | 1.12% | 0.18% | 0.09% |
| 12 | 48% | 30% | 20% | 1.00% | 0.50% | 0.50% |
| 13 | 30% | 20% | 48% | 1.00% | 0.50% | 0.50% |
| 14 | 30% | 30% | 39.58% | 0.15% | 0.18% | 0.09% |
| 15 | 30% | 0% | 68.85% | 0.15% | 0.50% | 0.50% |
| 16 | 68.85% | 0% | 30% | 0.15% | 0.50% | 0.50% |
| 17 | 0% | 68.85% | 30% | 0.15% | 0.50% | 0.50% |
| 18 | 30% | 68.85% | 0% | 0.15% | 0.50% | 0.50% |
| 19 | 29.58% | 30% | 40% | 0.15% | 0.18% | 0.09% |
| 20 | 70% | 0% | 29% | 0.50% | 0.25% | 0.25% |
| 21 | 29% | 0% | 70% | 0.50% | 0.25% | 0.25% |
| 22 | 99% | 0% | 0% | 0.50% | 0.25% | 0.25% |
| 23 | 0% | 99% | 0% | 0.50% | 0.25% | 0.25% |
| 24 | 0% | 0% | 99% | 0.50% | 0.25% | 0.25% |
| 25 | 100% | 0% | 0% | 0% | 0% | 0% |
| 26 | 0% | 100% | 0% | 0% | 0% | 0% |
| 27 | 0% | 0% | 100% | 0% | 0% | 0% |
| 28 | 0% | 0% | 0% | 100% | 0% | 0% |
| 29 | 99.63% | 0% | 0% | 0.10% | 0.18% | 0.09% |
| 30 | 0% | 99.63% | 0% | 0.10% | 0.18% | 0.09% |
| 31 | 0% | 0% | 99.63% | 0.10% | 0.18% | 0.09% |
| 32 | 99.68% | 0% | 0% | 0.05% | 0.18% | 0.09% |
| 33 | 0% | 99.68% | 0% | 0.05% | 0.18% | 0.09% |
| 34 | 0% | 0% | 99.68% | 0.05% | 0.18% | 0.09% |
| 35 | 30% | 30% | 39.68% | 0.05% | 0.18% | 0.09% |
| 36 | 39.68% | 30% | 30% | 0.05% | 0.18% | 0.09% |
| 37 | 0% | 39.68% | 30% | 0.05% | 0.18% | 0.09% |
| 38 | 70% | 0% | 29.3% | 0.1% | 0.6% | 0% |

TABLE 2

Polymer Formulations

Composition (percentage by weight)

| No. | 4060D | 4042D | 4032D | Antiblock | Slip | Plasticizer |
|---|---|---|---|---|---|---|
| 39 | 70% | 0% | 24.3% | 0.10% | 0.60% | 5% |
| 40 | 70% | 1% | 24.3% | 0.10% | 0.60% | 4% |
| 41 | 65% | 5% | 26.3% | 0.10% | 0.60% | 3% |
| 42 | 68% | 2% | 28.3% | 0.10% | 0.60% | 1% |
| 43 | 70% | 5% | 24.3% | 0.10% | 0.60% | 0% |
| 44 | 70% | 0% | 29.3% | 0.10% | 0.60% | 0% |
| 45 | 70% | 0% | 24.5% | 0.10% | 0.40% | 5% |
| 46 | 70% | 0% | 24.7% | 0.10% | 0.20% | 5% |
| 47 | 70% | 0% | 24.3% | 0.05% | 0.65% | 5% |
| 48 | 70% | 0% | 24.3% | 0.15% | 0.55% | 5% |
| 49 | 70% | 0% | 24.3% | 0.25% | 0.45% | 5% |

The blends in Tables above may be chosen or prepared to create the "feel" or flexibility of the film to match an end-use application. Where all other processing parameters are equal, the ratio of PLA polymers may be adjusted in accordance with the teachings of the instant invention to provide shrink films with desirable physical properties. For example, reducing the concentration of D-lactide (i.e., increasing weight percent 4032D) yields polymers with a higher softening point and films that require greater temperature to shrink, which moves the shrink curve to the right.

While the formulations listed in the tables above have been categorized based on the presence of a viscosity enhancer (Table 1) or a plasticizer (Table 2), formulations of the present invention may include both a viscosity enhancer and a plasticizer. Furthermore, all formulations (i.e., PLA polymer blends) may include one or more "color correction" dyes. Such dyes, known and available to those of ordinary skill in the art, are typically added to tint films (e.g., from a yellow to blue index) so to make them better suited for printing thereon. The concentration of color correction dyes generally ranges from about 0.002%-0.009%, preferably about 0.006%, by weight.

In a preferred embodiment, films are produced with a blend of about 94 weight percent PLA polymer and less than about 6 percent additives by weight and in which the PLA polymer component is about 70 percent 4060D PLA and 24 percent 4032D by weight. In another preferred embodiment, films are produced with a polymer blend according to formula no. 39.

Processing

After the polymer composition of the film is selected, the polymer is then processed to generate a film with desirable shrink properties. Generally, the polymers are procured in pellets or grains. In cases where multiple polymers are to be included, the polymers pellets are first dry blended. That is, the pellets are mixed together. In a preferred embodiment of the invention, the pellets are then processed into film by cast and tenner technology.

Cast and tenner processing involves the extrusion of polymers melted through a slot or flat die to form a thin, molten sheet or film. This film is first "polished" by the surface of a chill roll (typically temperature-regulated and chrome-plated). The film is then rolled through a machine direction orienting ("MDO") machine for temperature conditioning and stretched through a tenner frame. Finally, the film edges are slit prior to winding.

Thus, the cast and tenner method can be characterized in four essential steps: extrusion, casting, temperature conditioning and stretching. A preliminary step of drying the polymer pellets is preferable, but not required. As well, a terminal step of annealing may be preferable, but not required according to the instant teachings. An assembly for each processing step is generally depicted in FIG. 1 and will now be described in detail.

Drying

PLA polymers are generally supplied in sealed bags from the manufacturer and in relatively dry condition. Typically, the moisture content of these as-supplied PLA polymers is less than about 500 ppm and preferably less than about 200 ppm. Where the moisture level is deemed desirable, no further drying may be necessary or required. However, PLA readily absorbs moisture from the atmosphere and therefore, the blended polymer pellets are optionally and preferably first dried by heating in a dryer to remove surface moisture. Without being bound by or limited to theory, it is believed that the removal of moisture content may help control the relative viscosity loss due to hydrolysis. As mentioned above, higher temperatures and the presence of even a small amount of moisture can hydrolyze PLA in the ensuing melt phase.

PLA is generally produced by a reversible condensation reaction, which produces water; when undried PLA is heated, hydrolysis can occur and key mechanical properties of the PLA may be compromised. For example, the viscosity of the polymer, when melted, is inversely proportional to the percentage of free monomer therein. Therefore, in an attempt to minimize batch-to-batch variation in viscosity, preferably, significant moisture is removed from the polymer pellets. In some embodiments, a moisture content of less than about 200 ppm is preferable, and less than about 50 ppm, more preferable (measured by the Karl Fisher method).

A dehumidifying hopper with hot air at a relatively low dew point may be used; however, a variety of air dryers are known in the art and many of them may be suitable for drying, The present invention need not be limited to air dryers only, but may include other types of dryers, including baking ovens. A dehumidifying hopper may be desirable in some embodiments in that dehumidified air passes through a bed of PLA to extract moisture from the resin. A desiccant material, such as silica, absorbs moisture from the circulating air. Dual desiccant bed systems are common, so that one bed is on-stream while a stand-by bed is being regenerated. Either a time-cycle or a predetermined decrease in air dew point is used to shift airflow from one bed to the other. Such methodology is thought to be effective in removing some moisture that may reside below the surface of the polymer pellets in addition to the surface moisture.

Preferable dryers of the instant invention for drying PLA may have one or more of the following characteristics:
1. Desiccant beds capable of achieving a dew point of about −40° C. in the supply air
2. A means, e.g., an after-cooling unit, to eliminate or reduce the likelihood of a temperature spike in the supply air
3. Superior temperature control in the PLA drying range The temperature and duration of drying may be dependent on the total amount and condition of the polymer(s) (i.e., the amount of starting surface moisture), and may need to be adjusted on a batch-by-batch basis. Preferably, the polymers experience little to no melting in this step. By way of example, typical drying conditions require that temperatures range from about 40° C. to about 110° C., and preferably from about 55° C. to about 90° C. for variable periods of time. By way of specific example, the residence time for drying polymer with air (dew point, −40° C.) at a flow rate of greater than about 0.5 ft$^3$/min. requires about 4 hours at about 40° C. and about 2 hours at about 90° C. Higher drying temperatures may lead to softening and blocking of polymer, while lower drying temperatures can result in extended drying times and/or incomplete drying.

Dew point is an absolute measure of air moisture and is independent of air temperature. Dew point may be used to control dryer performance. Airflow is another component to drying, as it heats the resin and absorbs its moisture. Sufficient airflow can maintain the resin at the proper temperature for its entire residence time. In embodiments were additional colorants, additives, or otherwise ingredients are used, it may be preferable to minimize moisture-related degradation by further drying same.

Extrusion

Extrusion is whereby the pellets are melted into a low viscosity molten mass, thus combining the heretofore individual polymer beads or grains into one molten mass. The viscosity of the melt will depend on the temperature. Temperatures can range from about the temperature at which the polymers will remain melted to about the temperature where degradation of the polymers begins to occur. By way of example, extrusion melt temperatures may be maintained between about 165° C. to about 230° C. for certain PLA polymer blends, but may ultimately depend on the different polymers that have been blended and their respective melting points. In some embodiments, about 175° C., is preferred.

The molten plastic is then extruded thought a T style die with a flat slot opening. The opening should be adjusted to accommodate the thickness of the finished film. In other words, a greater opening should be used where thicker films are desired and vice versa. Generally, the opening will range between about 0.01 inches to about 0.10 inches and preferably between about 0.05 inches to about 0.07 inches. The draw-down distance (i.e., the distance from the die to the casting rollers) can also affect the thickness of the resultant film. Generally, the longer the distance, the thinner the film, and vice versa. Without being limited to or bound by theory, it is believed that the greater draw-down distances introduce undesirable machine direction orientation into the resultant film. Thus, while draw-down distances may range from 0.75 inches to about 1.5 inches, shorter distances are preferred. A draw down distance of about 0.750 inches is generally appropriate.

Casting

The relatively hot (e.g., about 175 to about 190° C.) plastic from the extruder is then "cast" between at least two rollers. Without being limited by or bound by theory, the temperature of the casting rollers should be adjusted to achieve rapid cooling over the exterior of the extrudate so as to form a "skin," which causes the extrudate to adhere to the rollers. At the same time, the temperature of the rollers should be maintained high enough so that the "core" of the extrudate remains pliable so to allow curving around the rollers without breakage or cracking.

Typical casting machines in the art are equipped with one or two rollers, wherein the plastic moves from the die, between a single large roller or two rollers and then on to the machine direction orientation machine. The present inventors have discovered, however, that while the typical casing machines are suitable in preparing the inventive films disclosed herein, the novel use of a third roller in the casting machine is preferable in the production of the films, particularly where improved surface quality of the films is desired. In fact, it is believed that the use of three or more rollers in the production of PLA film, more particularly thin gauge PLA film (e.g., less than about 0.002 in. film) has not been performed.

The use of a third or more roller(s) is believed to be one reason for significantly improved production speed. Whereas film is typically cast at about 130 feet/minute, the process described herein provides a line speed of about 250 feet/ minute. Without being limited to or bound by theory, it is believed that the additional roller(s) aids in the equilibration of the hotter core temperature with the cooler skin temperature. Accordingly, this third roller(s) is preferably maintained at a higher temperature than the first two rollers.

By way of example, all of the casting rollers may be set at a relatively cold temperatures (e.g., about 20 to about 45° C., preferably about 30° C. to about 40° C., for the first two rollers, and about 40 to about 65° C., preferably about 55 to about 60° C., for the third roller). The temperature of the rollers are may be maintained with liquids, such as water, oil. Water is a preferable coolant for the casting rollers because of its greater heat capacity than most conventional liquids. Typically, water can remove three times more heat (BTU) than oils for this purpose.

One of ordinary skill in the art should appreciate from the teachings presented herein, that the absolute temperature of the rollers will depend on several factors, including the initial temperature and thickness of the extruded plastic. Thus, the roller temperatures provided herein should not be construed as limiting to all the embodiments of the instant invention, but rather exemplary of a range for certain embodiments. Rather, the temperature of the rollers can and should be adjusted based on the thickness of the die opening, stretch ratio and the like. In one embodiment, for example, the first roller is set at about 40° C., the second at about 32° C. and the third at about 57° C.

In fact, more significant than the absolute temperature, any casting roller is the temperature of the extruded film as it exits the casting machine. The temperature of the film as it exits the casting machine is preferably between about 55° C. and about 75° C., and more preferably about 60° C.

In addition to adjusting the temperature of the plastic as it arrives from the die, the casting rollers can also be used to adjust the thickness of the plastic. This adjustment is made by presetting the gap between the roller to the desired thickness. For example, the gap between the first two rollers is preferably 2-10 times, more preferably 5-7 times, the final desired thickness of the film. Similarly, the gap between the second and third rollers is preferably 3-9 times, more preferably 4-6 times, the final desired thickness of the film.

Temperature Conditioning

The next step in preparation of films of the present invention is a temperature conditioning step. "Temperature conditioning" refers to the process of equilibrating the temperature of the plastic film such that temperature difference between the core and skin, if any at all, is minimized. While an MDO machine may be used in this process, orientation (i.e., stretching) in the machine direction ("MD") is preferably minimized because MD stretching leads to undesirable MD shrinking.

A variety of measures may be taken to limit or avoid MD stretching when using an MDO machine. For example, the speed to the MDO rollers may be adjusted to minimize "pulling" the film from one roller to the next. For example, the rollers may be maintained at similar speeds. (A film is at risk of being pulled when a subsequent roller turns faster than the one prior.) Alternatively, the distance between and location of the MDO rollers can contribute to MD stretching. For example, lateral movement of film typically is pulled less than horizontal movement.

The present inventors have found the novel use of "idler" rollers to bypass some MDO rollers to be beneficial to reducing MD stretching. Idle rollers are not motor driven and therefore "idle" unless film is passed over them. Idle rollers may, but need not, be temperature controlled. The number and location of idle rollers is not limiting and may be adjusted to suit specific processing parameters. In one embodiment of the present invention, two idle rollers are installed to bypass two central rollers in an MDO machine (FIGS. 1, A and B).

As with the casting rollers, more significant than the absolute temperature of any MDO roller is the temperature of the film as it exits the MDO machine. Indeed, the roller temperature may have to be adjusted in accordance with film thickness, desired stretch, etc. Preferably, the temperature of the film is equilibrated to between about 60° C. to about 90° C., and more preferably, about 70° C. In one embodiment of the invention, an MDO machine with 6 motorized, and two idle rollers are used as shown in FIG. 1: roller 4 is at about 72° C., roller 5 is at about 85° C., idle rollers 6 and 7 are not temperature controlled, roller 8 is at about 85° C., and roller 9 is at about 60° C.

Tenner

Once the extrudate has been temperature conditioned, it enters the tenner machine. This machine is equipped with tenner clips that clip onto the edge of the plastic film, which is generally about 20 inches wide. The tenner machine is fitted with an "A-frame" that stretches the plastic film to about 4 times its entering width (e.g., from 20 inches to 80 inches).

The tenner machine further consists of three temperature controlled zones along the A-frame. The preheating zone is provided to uniformly raise the temperature of the polymer and ensure that the film core temperature has equilibrated with the skin temperature. The stretching zone maintains proper stretching temperature. It should be appreciated from the teachings herein that the stretch temperature will need to be adjusted based on the particular PLA blend, practices and experience available to one of ordinary skill in the art. In one embodiment, however, this temperature is shared with the preheating zone, which is between about 70° C. and about 90° C., more preferably about 80° C. The final zone is the annealing zone.

Annealing

Annealing, also called crystallization or relaxation, is typically the final step in the preparation of films of the instant invention. According to the teachings herein, an annealing step is optional. When desired, annealing is generally accomplished post-stretching and is performed at temperatures between about 49° C. to about 90° C., preferably about 70° C. During annealing, the film "relaxes" to a small extent. Relaxation rates of about 0.5% to about 5% are typical, and about 3% or less is preferred. Lastly, the edges of the stretched film are trimmed and wound onto rollers by conventional means.

Film properties using the aforementioned protocol can be manipulated as desired with nominal trial and error by one of ordinary skill in the art. Such variations are expected and are incorporated into the scope of the invention. Films of the instant invention can generally have characteristics that fall into the following ranges:

Film shrinkage at about 60° C. for about 10 seconds
  Transverse direction: about 10% to about 70%, with an average of about 25%.
  Machine direction: about −2% to about 1%, with an average of about 0%.

Figure 2:
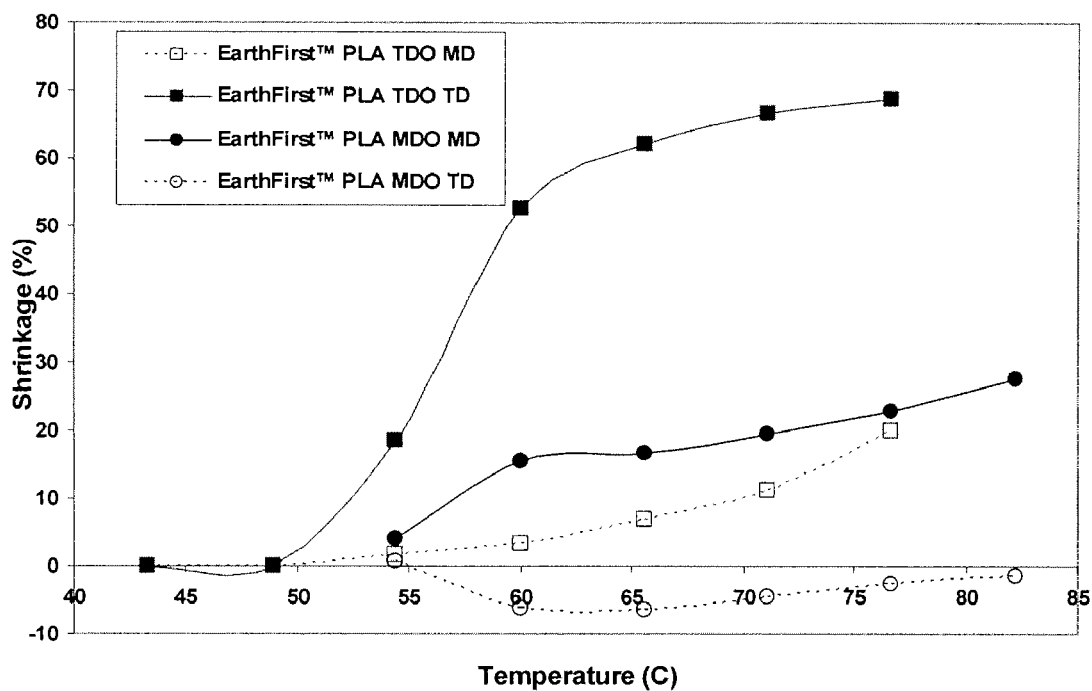
FIG. 2 is a graph depicting the percent shrinkage of a cast PLA film ("TDO") of the present invention at a given temperature for ten seconds compared to blown PLA film ("MDO"). Both machine direction (MD) and transverse direction (TD) shrinkage is provided.

In one embodiment of the instant invention, percent shrinkage as a function of temperature was studied with, for example, 200 gauge (0.002 in.) film subjected to 10 second exposures to heat (FIG. 2). The films tested herein were prepared from a blend of about 70% grade 4060D PLA, about 26% grade 4032D PLA, about 1% grade 2100D antiblock of which 10% is "active ingredient," and about 3% slip EBS, of which 20% is active ingredient. (The term "about" has been used herein and throughout this specification to account for the customary variations in measurements of mass, temperature and percent shrinkage common and expected by one of ordinary skill practicing this art.)

Using the process described above, the polymer blend, without additional drying, was extruded at about 190° C., and was subsequently extruded through a T style die with an opening of about 0.070 inches. The film was then cast between three rollers at about 40° C., 32° C., and 57° C. in sequence yielding a film temperature of about 65° C. The film was then temperature conditioned in an MDO machine equipped with six motorized rollers and two idler rollers as shown in FIG. 1. This step yielded a film temperature of about 70° C. Finally, the film was 4× stretched in a tenner machine, annealed at about 70° C., trimmed and wound.

The film were placed in a hot water bath at the temperature shown for the indicated times, and the shrinkage in the machine direction (MD) and the transverse direction (TD) as a percentage of the original dimensions was plotted. While the shrink films studied in this example were subjected to heated water, exposure to heat in any form (e.g., heated air from a hot air dryer) may induce shrinkage of the inventive films. As is evident from the results, the films described exhibit shrinkage in the TD and little to no shrinkage in the MD. At about 60° C., for example, the inventive film shrinks more than 25% in the TD and less than 1% in the MD.

Figure 3:
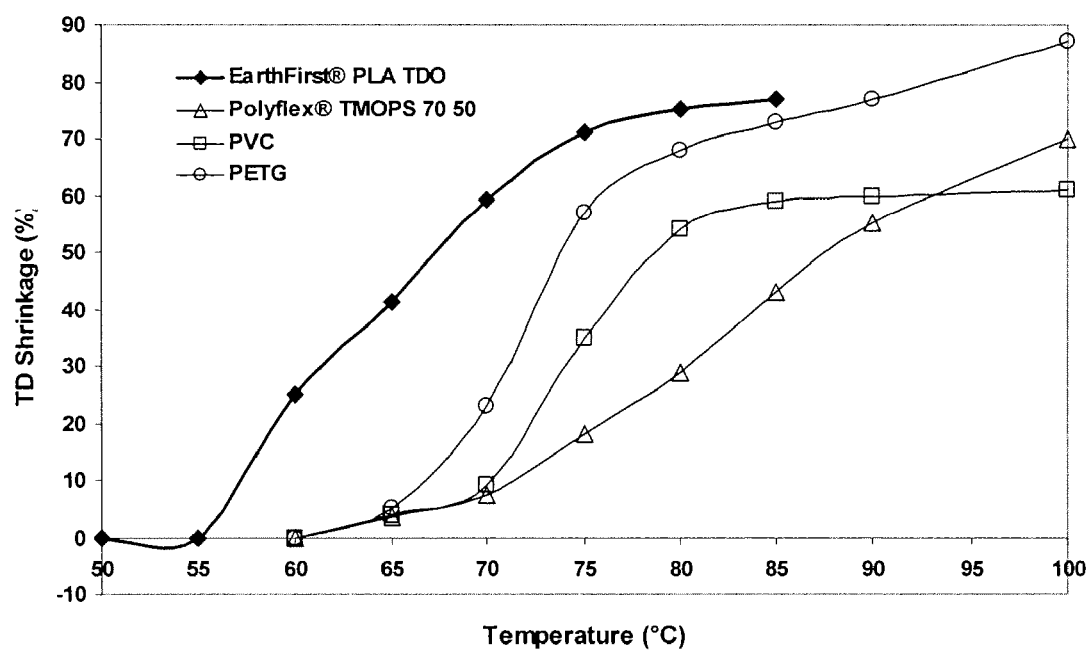
FIG. 3 is a graph depicting the percent TD shrinkage of the inventive PLA TDO films in relation to non-PLA TDO films. PLA: Polylactic Acid; TMOPS: Transverse Mono-Oriented Polystyrene; PETG: Glycol Modified Polyethylene Terephthalate; PVC: Polyvinyl Chloride.
Figure 4:
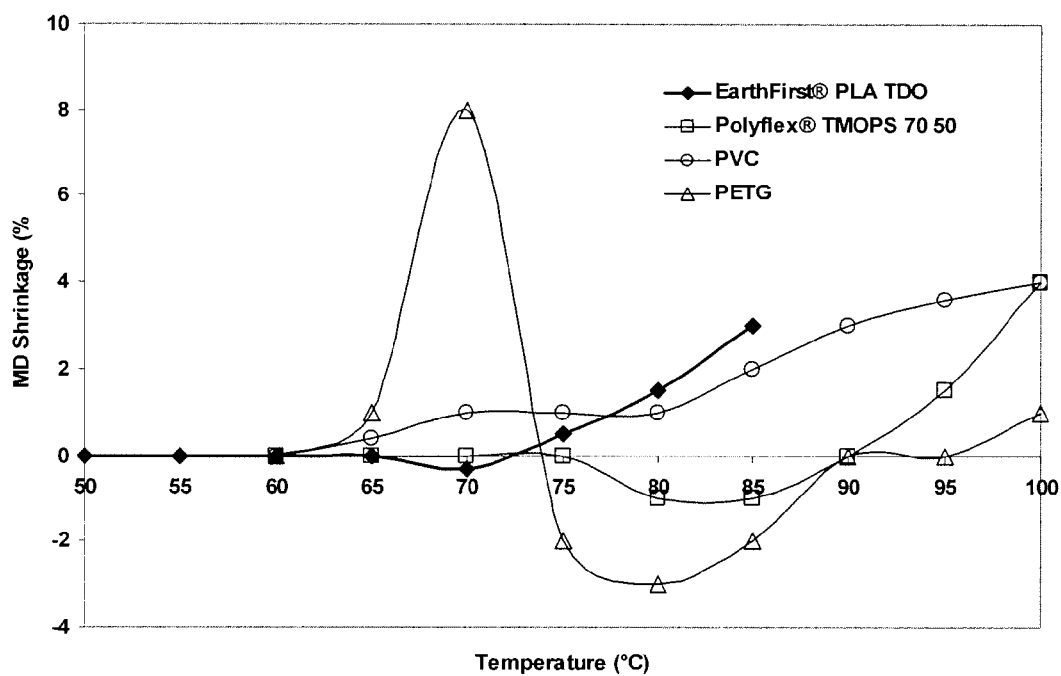
FIG. 4 is a graph depicting the percent MD shrinkage of the inventive PLA TDO films in relation to non-PLA TDO films.

The shrink properties of the inventive films were also compared with PLA blown film (FIG. 2) and cast/tenner films comprising polymers other than PLA (FIGS. 3 and 4). FIG. 2 shows that the instant films ("TDO") exhibit greater shrinkage than blown "MDO" films in the TD at a given temperature. FIG. 3 demonstrates that the TD shrink curve of the instant PLA films, while comparable in magnitude, occurs at a lower temperature than non-PLA TDO films. For example, TDO PLA can shrink over 60% in the TD at about 70° C. whereas TDO PETG must be heated to about 80° C. to shrink the same amount. Effective shrinkage at lower temperatures is particularly desirable in applications where heat may be detrimental to the packaged product, such as, for example, with dairy products. Thus, the inventive PLA TDO films outperform PETG TDO where pre-labeled bottles (e.g., milk and/or dairy packaging) are preferably kept at the coolest operable temperature. Finally, FIG. 4 shows that (1) the instant films have shrinkage in the MD concomitant with shrinkage in the MD and (2) this shrinkage can occur at relatively low temperatures. PETG TDO, for example, shrinks in the MD before shrinkage in the TD, which results in undesirable drawing back at the edges.

This growth in the cross direction can prevent the label from curling back on the edges during the shrinking process. Accordingly, in one embodiment, films of the present invention may have application in sleeve (i.e., tube) labeling of various shaped cylinders and cones such as, for example, batteries, cans, bottles, disposable lighters, pens, floral wraps and other decorative items. However, the scope of applications should not be limited to the aforementioned consumer products or uses.

Films of the present invention have innumerable other applications. For example, these films can also be used in printed/unprinted application for holding together twin packs, attachments, neck bands, and perforated neck bands for decoration or tamper evident use, to name a few options.

The many features and advantages of the invention are apparent from the detailed specification, and thus, it is intended by the appended claims to cover all such features and advantages of the invention, which fall within the spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, fall within the scope of the invention.

What is claimed is:

1. A shrink film comprising a transverse direction oriented polylactic acid (PLA) polymer blend film which, upon exposure to 60° C. heat for about 10 seconds, exhibits shrinkage in the transverse direction in the range of about 10% to about 80% and shrinkage in the machine direction, that does not exceed about 10%.

2. The shrink film of claim 1 in which the shrinkage in the machine direction does not exceed about 5%.

3. The shrink film of claim 1 in which the film exhibits shrinkage in the transverse direction in the range of about 30% to about 80% and exhibits a shrinkage in the machine direction in the range of about 0% to about 3% when subjected to about 60° C. heat for about 10 seconds.

4. The shrink film of claim 3 in which the film exhibits shrinkage in the transverse direction in the range of about 50% to about 70% and exhibits a shrinkage in the machine direction of about 1% or less when subjected to about 60° C. heat for about 10 seconds.

5. The shrink film of claim 1 further comprising one or more additives.

6. The shrink film of claim 5 in which the one or more additives is an antiblock additive, a slip additive, a plasticizer, a viscosity enhancer or a combination thereof.

7. The shrink film of claim 6 in which the antiblock additive is natural silica, synthetic silica, talc, talc filled magnesium, calcium carbonate, and N,N'-Ethylene Bis(Stearamide) (EBS).

8. The shrink film of claim 7 in which the antiblock additive is talc filled magnesium.

9. The shrink film of claim 6 in which the slip additive is oleamide, erucamide, stearamide, behenamide, oleyl palmitamide, stearyl erucamide, ethylene bis-oleamide, EBS, or a combination thereof.

10. The shrink film of claim 9 in which the slip additive is EBS.

11. The shrink film of claim 6 in which the viscosity enhancer is a stabilizer or a coupling agent.

12. The shrink film of claim 1 in which the PLA polymer blend includes two or more grades of PLA polymer.

13. The shrink film of claim 12 in which the PLA polymer grades are about 1 to about 2 percent by weight D-lactide, about 3 to about 5 percent by weight D-lactide and about 11 to about 13 percent by weight D-lactide.

14. The shrink film of claim 13 comprising about 50 weight percent to about 90 weight percent of PLA polymer having about 11 to about 13 percent by weight D-lactide; and about 10 weight percent to about 50 weight percent of a PLA polymer having about 1 to about 2 percent by weight D-lactide.

15. The shrink film of claim 14 comprising about 60 weight percent to about 80 weight percent of PLA polymer having about 11 to about 13 percent by weight D-lactide; and about 20 weight percent to about 40 weight percent of a PLA polymer having about 1 to about 2 percent by weight D-lactide.

16. The shrink film of claim 15 comprising about 65 weight percent to about 75 weight percent of PLA polymer having about 11 to about 13 percent by weight D-lactide; and about 25 weight percent to about 35 weight percent of a PLA polymer having about 1 to about 2 percent by weight D-lactide.

17. The shrink film of claim 16 further comprising an antiblock additive, a slip additive, a viscosity enhancer or a combination thereof.

18. The shrink film of claim 17 comprising about 50 weight percent to about 90 weight percent of PLA polymer having about 11 to about 13 percent by weight D-lactide; about 10 weight percent to about 50 weight percent of a PLA polymer having about 1 to about 2 percent by weight D-lactide; less than about 3 percent by weight of an antiblock additive; less than about 1 percent of a slip additive; and less than about 0.5 percent of a viscosity enhancer.

19. The shrink film of claim 18 comprising about 50 weight percent to about 90 weight percent of PLA polymer having about 11 to about 13 percent by weight D-lactide; about 10 weight percent to about 50 weight percent of a PLA polymer having about I to about 2 percent by weight D-lactide; less than about 2 percent by weight of an antiblock additive; less than about 0.5 percent of a slip additive; and less than about 0.25 percent of a viscosity enhancer.

20. A shrink film comprised of a polylactic acid (PLA) polymer blend which, upon exposure to 60° C. heat for about 10 seconds, exhibits shrinkage in the transverse direction in the range of about 10% to about 80% and controlled growth in the machine direction.

21. The shrink film of claim 20 in which the film exhibits shrinkage in the transverse direction in the range of about 50% to about 70% and exhibits a shrinkage in the machine direction in the range of about 0% to about −3% (a negative value indicates growth) when subjected to about 60° C. heat for about 10 seconds.

22. A packaged good comprising a consumable item and a heat treated PLA shrink sleeve over at least a portion of the consumable item, which heat treated film is obtained by exposing to heat a shrink film comprising a transverse direction oriented PLA polymer blend film which, upon exposure to 60° C. heat for about 10 seconds, exhibits shrinkage in the transverse direction in the range of about 10% to about 80% and shrinkage in the machine direction that does not exceed about 10%.

23. A method of casting a transverse direction oriented PLA shrink film which, upon exposure to 60° C. heat for about 10 seconds, exhibits shrinkage in the transverse direction in the range of about 10% to about 80% and shrinkage in the machine direction that does not exceed about 10%, comprising (a) providing dry pellets of PLA, (b) melting the pellets to form a molten mass, (c) extruding the resulting molten mass, (d) casting the extrusion between three or more casting rollers to form a film, (e) temperature conditioning the film, and (t) stretching the film in the transverse direction.

* * * * *